(12) United States Patent
Masato

(10) Patent No.: US 11,400,678 B2
(45) Date of Patent: Aug. 2, 2022

(54) PRESS DEVICE AND METHOD FOR CONTROLLING PRESS DEVICE

(71) Applicant: KOMATSU INDUSTRIES CORPORATION, Kanazawa (JP)

(72) Inventor: Yusuke Masato, Kanazawa (JP)

(73) Assignee: KOMATSU INDUSTRIES CORPORATION, Ishikawa (JP)

( * ) Notice: Subject to any disclaimer, the term of this patent is extended or adjusted under 35 U.S.C. 154(b) by 216 days.

(21) Appl. No.: 16/617,892

(22) PCT Filed: Aug. 7, 2018

(86) PCT No.: PCT/JP2018/029590
§ 371 (c)(1),
(2) Date: Nov. 27, 2019

(87) PCT Pub. No.: WO2019/054093
PCT Pub. Date: Mar. 21, 2019

(65) Prior Publication Data
US 2020/0156345 A1  May 21, 2020

(30) Foreign Application Priority Data
Sep. 14, 2017 (JP) .............................. JP2017-176974

(51) Int. Cl.
*B30B 15/14* (2006.01)
*H02J 7/34* (2006.01)
*H02P 7/18* (2006.01)

(52) U.S. Cl.
CPC ............ *B30B 15/148* (2013.01); *B30B 15/14* (2013.01); *H02J 7/345* (2013.01); *H02J 2207/20* (2020.01); *H02P 7/18* (2013.01)

(58) Field of Classification Search
CPC .......... B30B 15/14; B30B 15/148; H02J 7/00; H02J 7/345; H02J 2207/00; H02J 2207/50; H02P 29/028; H02P 1/445; G05F 5/00
See application file for complete search history.

(56) References Cited

U.S. PATENT DOCUMENTS

| | | | |
|---|---|---|---|
| 2011/0273141 A1* | 11/2011 | Kanbayashi | .......... E02F 9/2025 320/134 |
| 2017/0239704 A1 | 8/2017 | Nishida | |

(Continued)

FOREIGN PATENT DOCUMENTS

| | | |
|---|---|---|
| CN | 2666656 Y | 12/2004 |
| CN | 102301561 A | 12/2011 |

(Continued)

OTHER PUBLICATIONS

The International Search Report for the corresponding international application No. PCT/JP2018/029590, dated Nov. 6, 2018.

*Primary Examiner* — Debra M Sullivan
*Assistant Examiner* — Matthew Stephens
(74) *Attorney, Agent, or Firm* — Global IP Counselors, LLP

(57) ABSTRACT

A press device subjects a material to pressing using an upper die and a lower die. The press device includes a slide, a bolster disposed below the slide, a servomotor configured to drive the slide, a plurality of capacitor units, and a control unit. The upper die can be attached to a lower face of the slide. The lower die can be placed on the bolster. The capacitor units include a plurality of electric double layer capacitors. The plurality of capacitor units are configured to be able to supply stored electric power to the servomotor. The control unit executes an operation mode in which pressing is performed using capacitor units other than (Continued)

unused capacitor units when the plurality of capacitor units have been set so that at least a portion of the capacitor units are not used.

13 Claims, 10 Drawing Sheets

(56) References Cited

U.S. PATENT DOCUMENTS

| | | | | |
|---|---|---|---|---|
| 2017/0310120 A1* | 10/2017 | Birkl | ................... | H02J 7/0003 |
| | | | | 320/134 |
| 2018/0248388 A1* | 8/2018 | Takatsuka | ............... | B60L 53/80 |
| | | | | 320/134 |

FOREIGN PATENT DOCUMENTS

| CN | 104333107 A | * | 2/2015 | ................ H02J 7/34 |
| --- | --- | --- | --- | --- |
| CN | 104339695 A | | 2/2015 | |
| CN | 105936202 A | | 9/2016 | |
| CN | 107073549 A | | 8/2017 | |
| JP | 2003-230997 A | | 8/2003 | |
| JP | 2008-289271 A | | 11/2008 | |
| JP | 2008289271 A | * | 11/2008 | ................ H02J 9/06 |
| JP | 2009-148130 A | | 7/2009 | |
| JP | 2010-86764 A | | 4/2010 | |
| JP | 2010177012 A | * | 8/2010 | ............. H05B 41/16 |
| JP | 2010-260094 A | | 11/2010 | |
| JP | 2010260094 A | * | 11/2010 | ............. B30B 15/14 |

\* cited by examiner

PRESS DEVICE AND METHOD FOR CONTROLLING PRESS DEVICE

CROSS-REFERENCE TO RELATED APPLICATIONS

This application is a U.S. National stage application of International Application No. PCT/JP2018/029590, filed on Aug. 7, 2018. This U.S. National stage application claims priority under 35 U.S.C. § 119(a) to Japanese Patent Application No. 2017-176974, filed in Japan on Sep. 14, 2017, the entire contents of which are hereby incorporated herein by reference.

BACKGROUND

Field of Invention

The present invention relates to a press device and to a control method for a press device.

Background Information

Automobile manufacturers, for example, produce body panels and the like with a press device that makes use of dies. In recent years, servomotor-driven press machines have been used as press devices.

With a servomotor-driven press machine such as this, the peak power is quite high during pressing, and there may be problems such as flickering due to a drop in the voltage inside or outside the plant.

Meanwhile, a configuration has been disclosed in which an aluminum electrolytic capacitor is installed as an electrical storage device in a press device in order to keep the peak power down (see JP-A 2003-230997, for example).

SUMMARY

However, when a plurality of power storage devices are used to increase the storage capacity, if some of the power storage devices should fail or deteriorate, the entire press must be stopped, and production will also come to a halt.

It is an object of the present invention to provide a press device with which pressing can be performed even when some of a plurality of power storage devices have become unusable, as well as a method for controlling a press device.

In order to achieve the stated object, the invention is a press device that subjects a material to pressing using an upper die and a lower die, and comprises a slide, a bolster, a servomotor, a plurality of capacitor units, and a control unit. An upper die is attached to the lower face of the slide. The bolster is disposed below the slide, and the lower die is placed on the bolster. The servomotor drives the slide. The plurality of capacitor units have a plurality of electric double layer capacitors and can supply stored electric power to the servomotor. The control unit executes an operation mode in which, when at least a portion of the capacitor units have been set so that they are not used, the capacitor units other than the ones not being used are used to carry out pressing.

The method for controlling a press device according to another invention is a method for controlling a press device comprising a slide to which an upper die is attached and a bolster on which a lower die is placed, and includes an execution step. This execution step involves executing an operation mode in which pressing is performed using capacitor units other than unused capacitor units when a plurality of capacitor units that have a plurality of electric double layer capacitors and can supply stored power to a servomotor that drives the slide have been set so that at least a portion of the capacitor units are not used.

The present invention provides a press device with which pressing can be performed even when some of a plurality of power storage devices have become unusable, as well as a method for controlling a press device.

DETAILED DESCRIPTION OF EMBODIMENT(S)

The press device of the present invention will now be described with reference to the drawings.

1. Configuration

1-1. Overview of Press Device

Figure 1:
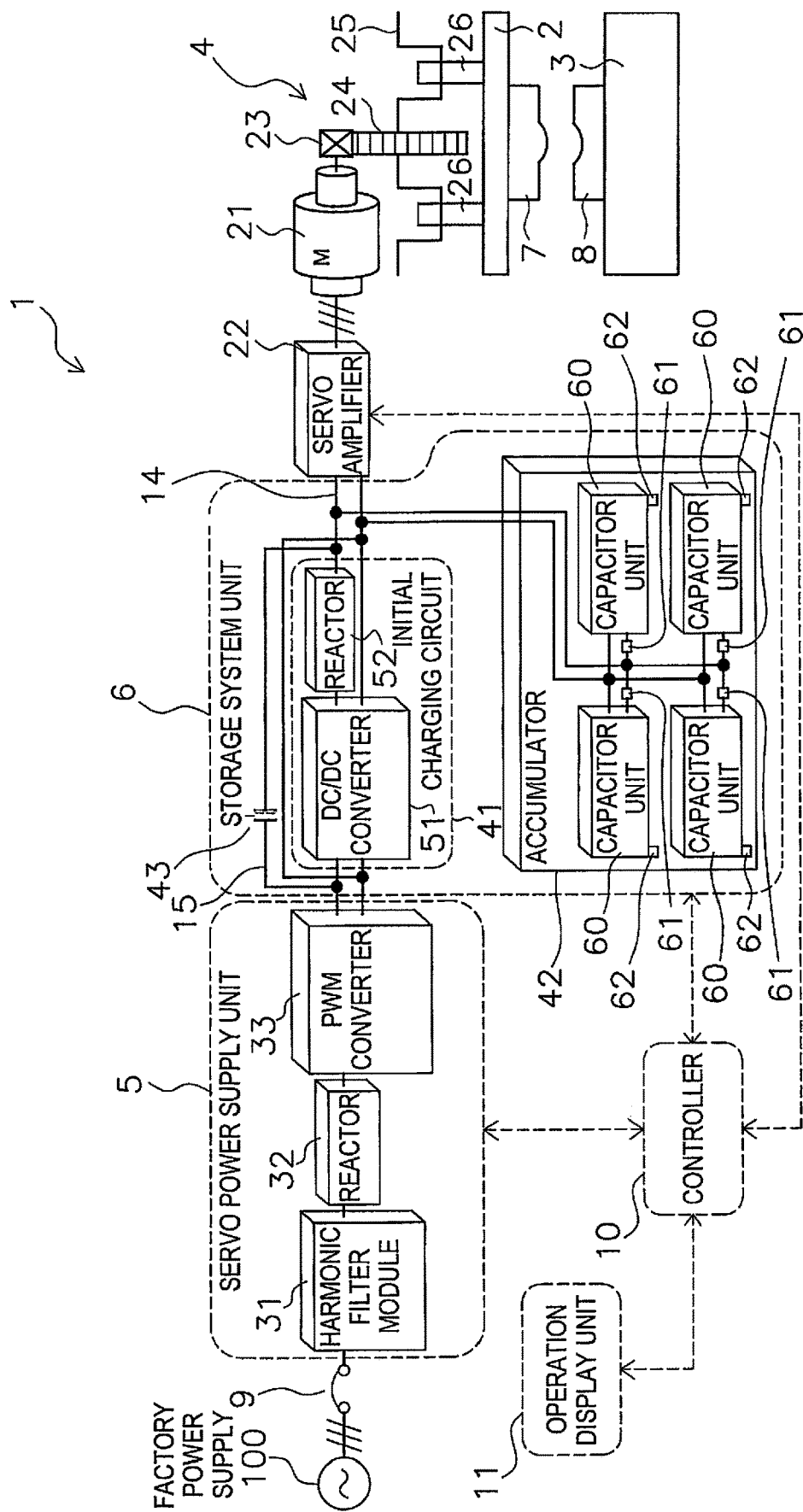
FIG. 1 is a simplified view of a press device according to an embodiment of the present invention.

FIG. 1 is a simplified view of the configuration of a press device 1 according to Embodiment 1 of the present invention.

The press device 1 in this embodiment subjects a material to pressing using an upper die 7 and a lower die 8. The press device 1 mainly comprises a slide 2, a bolster 3, a slide driver 4, a servo power supply unit 5, a storage system unit 6, a main breaker 9, a controller 10, and an operation display unit 11.

The upper die 7 is attached to the lower face of the slide 2. The lower die 8 is placed on the upper face of the bolster 3. The slide driver 4 moves the slide 2 up and down. The servo power supply unit 5 converts alternating current supplied from a factory power supply 100 into direct current and outputs it to the storage system unit 6. The storage system unit 6 stores the power from the factory power supply 100 or the regenerative power generated in the slide driver 4. The main breaker 9 switches on and off the power supplied from the factory power supply 100 to the press device 1. The controller 10 controls the slide driver 4, the servo power supply unit 5, and the storage system unit 6. An operation screen is displayed on the operation display unit 11, and operations by the user are inputted there.

1-2. Slide Driver

The slide driver 4 has a servomotor 21, a servo amplifier 22, a pinion gear 23, a main gear 24, a crankshaft 25, and a connecting rod 26. The servomotor 21 is the drive source for the slide 2. The servo amplifier 22 supplies drive current to the servomotor 21. The pinion gear 23 is linked to the servomotor 21 and is rotated by the rotation of the servomotor 21. The main gear 24 meshes with the pinion gear 23 and rotates along with the pinion gear 23. The crankshaft 25 is linked to the main gear 24 and is rotated by the rotation of the main gear 24. The connecting rod 26 connects the crankshaft 25 and the slide 2. In this embodiment, two connecting rods 26 are provided.

When the servomotor 21 is rotated by the drive current from the servo amplifier 22, the pinion gear 23 rotates, and the main gear 24 also rotates along with the pinion gear 23. The crankshaft 25 is rotated by the rotation of the main gear 24, and the connecting rods 26 move up and down. As a result, the slide 2 to which the connecting rods 26 are connected also moves up and down.

1-3. Servo Power Supply Unit

The servo power supply unit 5 has a harmonic filter module 31, a reactor 32, and a PWM converter 33. The harmonic filter module 31 prevents harmonic waves generated in the PWM converter 33 from going back to the factory power supply 100 side.

The reactor 32 and the PWM converter 33 constitute a chopper circuit, which converts alternating current into direct current and boosts the voltage. The factory power supply 100 supplies alternating current of a certain voltage, and the PWM converter 33 outputs direct current of a voltage higher than this certain voltage. The PWM converter 33 and the servo amplifier 22 are connected by a DC bus line 14. The PWM converter 33 also monitors the voltage on the DC bus line 14.

1-4. Storage System Unit

The storage system unit 6 has an accumulator 42 provided with a plurality of electric double layer capacitors 601 (see FIG. 2, described below), an initial charging circuit 41 that charges the electric double layer capacitors 601 before operation, and a short circuit contactor 43 that bypasses the initial charging circuit 41.

1-4-1. Initial Charging Circuit

The initial charging circuit 41 is provided on the DC bus line 14 and is a circuit for charging the electric double layer capacitors 601 (described below) provided to the accumulator 42. That is, since the electric double layer capacitors 601 of the accumulator 42 are not charged before operating the press device 1, they are charged with the power supplied from the factory power supply 100. The initial charging circuit 41 has a DC/DC converter 51 and a reactor 52. The initial charging circuit 41 throttles the current so that it will not flow all at once into the electric double layer capacitors 601 during charging.

1-4-2. Short Circuit Contactor

The short circuit contactor 43 is provided on a bypass line 15 connected to the DC bus line 14 so as to bypass the initial charging circuit 41. That is, the bypass line 15 is connected to the DC bus line 14 on the PWM converter 33 side of the initial charging circuit 41, and is connected to the DC bus line 14 on the servo amplifier 22 side of the initial charging circuit 41. When the short circuit contactor 43 is switched on, the current outputted from the PWM converter 33 bypasses the initial charging circuit 41 and is supplied to the servo amplifier 22.

1-4-3. Accumulator

The accumulator 42 has four capacitor units 60 provided with 24 electric double layer capacitors 601 (see FIG. 2), four current sensors 61, and four temperature sensors 62.

Figure 2:
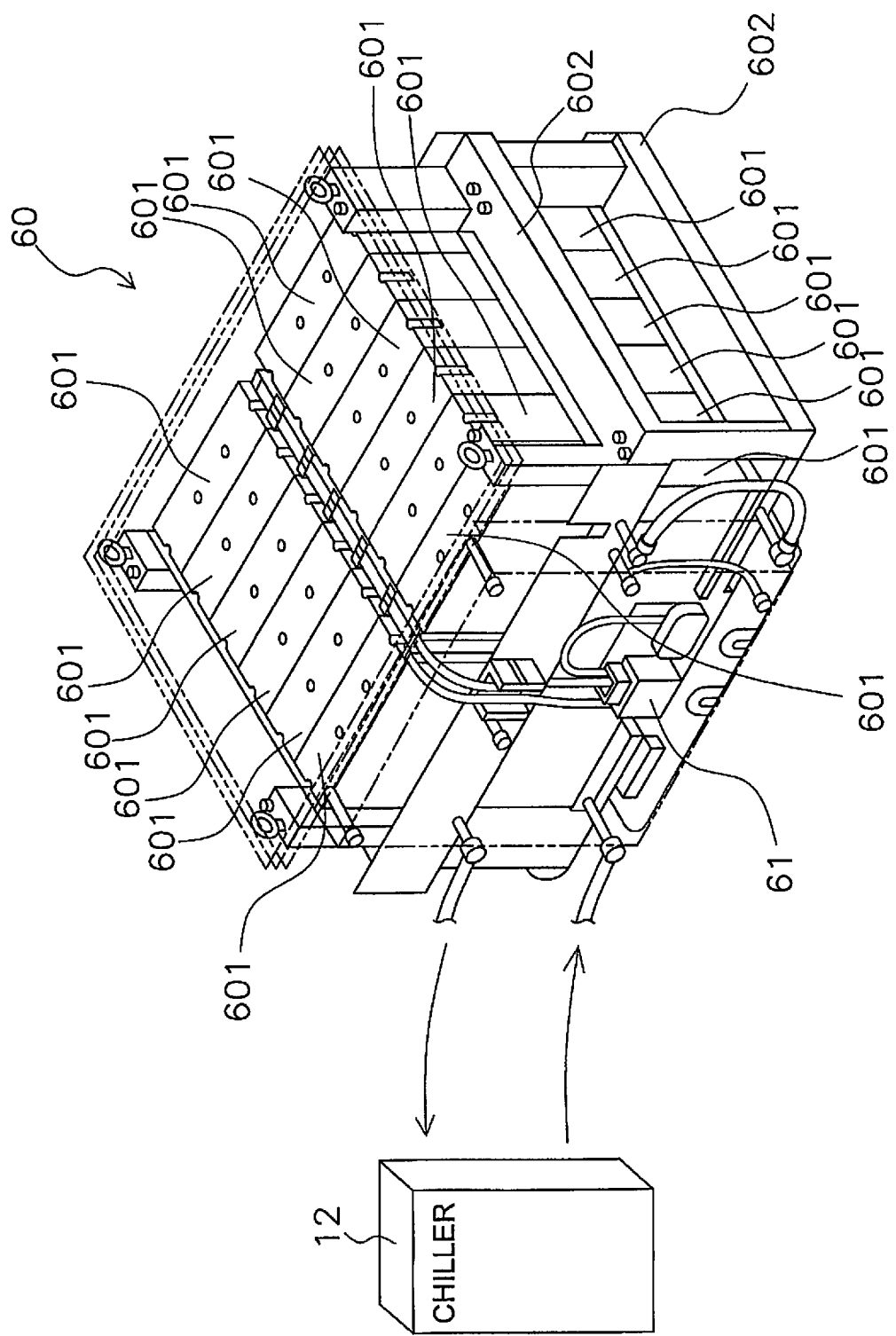
FIG. 2 is an oblique view of the capacitor units of the press devices in FIG. 1.

FIG. 2 is a view of a capacitor unit 60 provided to the accumulator 42. In this embodiment, the capacitor unit 60 has two heat sinks 602 and 24 serially connected electric double layer capacitors 601 (an example of a power storage device).

The two heat sinks 602 are disposed one above the other. In the capacitor unit 60, a heat sink 602 and twelve electric double layer capacitors 601 mounted on the heat sink 602 are provided in two levels. The two heat sinks 602 and the 24 electric double layer capacitors 601 are fixed by a frame member or the like. The heat sinks 602 are plate-shaped members formed from aluminum, and channels through which cooling water flows are formed in the heat sinks 602. The cooling water is supplied from a chiller 12 to the channels of the heat sinks 602. The cooling water is circulated by the chiller 12.

With the press device 1 in this embodiment, as shown in FIG. 1, four capacitor units 60 are provided, and the four capacitor units 60 are connected in parallel to a line (specifically, the DC bus line 14) that supplies power from the factory power supply 100 to the servomotor 21. More precisely, the four capacitor units 60 are coupled between the servo amplifier 22 and the part of the DC bus line 14 where the bypass line 15 is connected. Incidentally, reference in this Specification to the voltage of the electric double layer capacitors 601 indicates the voltage of a capacitor unit 60 (24 electric double layer capacitors 601 connected in series).

The current sensors 61 are provided on the connection line between each capacitor unit 60 and the DC bus line 14. A current sensor 61 measures the current flowing from each capacitor unit 60 to the DC bus line 14. The current sensor 61 can detect capacitance deterioration, disconnection, short circuiting, or the like of the capacitor unit 60. An abnormality in a capacitor unit 60 can be detected by sensing that the current from one capacitor unit 60 is lower than the current from the other three capacitor units 60, for example.

A temperature sensors 62 is provided to each of the capacitor units 60. A temperature sensor 62 can sense the temperature of an electric double layer capacitor 601, and can detect, for example, clogging of a cooling water pipe, an increase in the internal resistance of a capacitor, or the like.

When a state detector 71 (discussed below) detects an abnormality in any of the capacitor units 60 on the basis of the detection values from the current sensors 61 or the temperature sensors 62, the operation display unit 11 (discussed below) gives a display to that effect.

1-5. Controller

Figure 3:
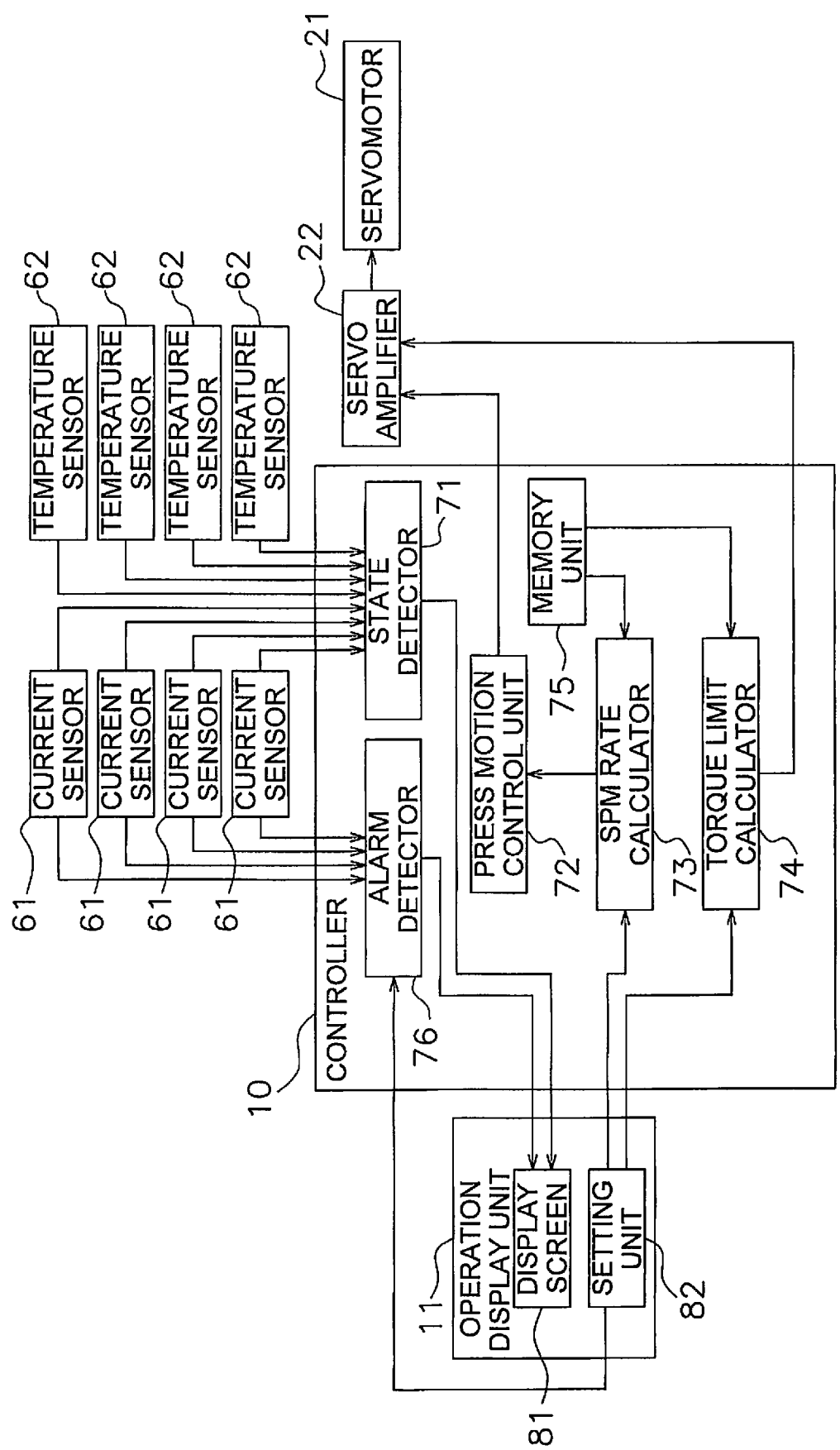
FIG. 3 is a block diagram of the configuration of the controller of the press device in FIG. 1.

FIG. 3 is a block diagram of the configuration of the controller 10. The controller 10 has the state detector 71, a press motion control unit 72, an SPM rate calculator 73, a torque limit calculator 74, a memory unit 75, and an alarm detector 76.

In this embodiment, when an abnormality is detected in at least one capacitor unit 60 by the state detector 71, the capability of the press device 1 is limited so that operation will be possible with the capacitor units 60 other than the capacitor unit 60 in which the abnormality was detected. Pressing is then performed in the emergency operation mode with this limitation. In this embodiment, the limitation is the SPM (shots per minute) rate and the torque limit. The SPM rate is calculated by the SPM rate calculator 73, and the torque limit is calculated by the torque limit calculator 74.

1-5-1. State Detector

The state detector 71 detects the state of each of the capacitor units 60 on the basis of the detection values from the current sensor 61 and the temperature sensor 62 provided to each of the four capacitor units 60. More specifically, the state detector 71 detects abnormalities such as disconnection, short circuiting, and capacity deterioration in each capacitor unit 60 on the basis of the detection value of the current sensor 61. The state detector 71 detects that a short circuit, a disconnection, or the like has occurred when the detection value drops below a predetermined threshold value that has been set in advance. For capacitance deterioration, for example, the capacitance of the capacitor is calculated by measuring the charging current and duration when passing through a specific voltage range during initial charging, and it can be concluded that the capacity has deteriorated if this capacitance has dropped below a predetermined threshold.

Also, the state detector 71 detects clogging of the cooling water pipe of each capacitor unit 60, an increase in internal resistance of a capacitor, and so forth on the basis of the detection value of the temperature sensor 62. When the detected value reaches a temperature over a predetermined threshold that has been set in advance, the state detector 71 detects that clogging of the cooling water pipe or an increase in the internal resistance of the capacitor has occurred. These threshold values may be stored in the memory unit 75 (discussed below).

The state detector 71 causes the display screen 81 of the operation display unit 11 to give a display when it is detected that an abnormality has occurred in any of the four capacitor units 60. Based on this display, the operator operates a setting unit 82 (discussed below) of the operation display unit 11 to set the capacitor unit 60 in which the abnormality was detected as unusable, and cuts off the electrical connection to the DC bus line 14 of the capacitor units 60 in which the abnormality was detected. Cutting off the electrical connection involves unplugging an electrical cord or other such power line.

1-5-2. Press Motion Control Unit

The press motion control unit 72 transmits a position command to the servo amplifier 22 on the basis of a predetermined press motion to control the servomotor 21. Here, the "predetermined press motion" may be, for example, a motion produced by the operator from a basic press motion stored in a memory unit (not shown), or may be a press motion selected by the operator from among a plurality of stored press motions. The basic press motion and the plurality of press motions may be stored in the memory unit 75 (discussed below).

1-5-3. SPM Rate Calculator

The SPM rate calculator 73 calculates the SPM rate on the basis of the number of usable capacitor units 60 other than the capacitor units 60 set as unusable (that is, invalid) by the setting unit 82. Reducing the SPM allows the effective value of the current to be reduced. The SPM ratio calculator 73 sets the SPM ratio to be lower as the number of usable capacitor units 60 decreases, thereby setting to a value at which the effective value of the current can be covered by the factory power supply 100 (the output from the PWM converter 33) and the number of usable capacitor units 60.

More specifically, if we let the number of capacitor units installed in the press device 1 be Na (four in this embodiment), let the number of usable capacitor units 60 be Nb (0 to 3), let the rated current of one capacitor unit 60 be Cr (A), let the rated output from the PWM converter 33 be Pr (A), and let the limit set for the PWM converter be L (%), the SPM rate calculator 73 calculates the SPM rate using the following formulas (1) to (3).

$$\text{Rated current value} = Cr \times Na + Pr \times L (\%) \quad (1)$$

$$\text{Allowable current value} = Cr \times Nb + Pr \times 100 (\%) \quad (2)$$

$$\text{SPM rate (\%)} = \text{allowable current value} \div \text{rated current value} \times 100 (\%) \quad (3)$$

The rated current value indicates the current supplied to the servo amplifier 22 when using the power from all the capacitor units 60 (four) installed in the press device 1 and the power supplied from the factory power supply 100 via the PWM converter 33.

The allowable current value indicates the current that can be supplied to the servo amplifier 22 when using the power supplied from the usable capacitor units 60 (for example, three) and the power supplied from the factory power supply 100 via the PWM converter 33.

The SPM rate is set to the ratio of the allowable current value to the rated current value.

Thus by making SPM smaller than SPM during pressing at the rated current value allows the pressing to be performed at the allowable current value.

The SPM rate calculator 73 transmits the calculated SPM rate to the press motion control unit 72. The press motion control unit 72 sends a position command to the servo amplifier 22 to drive at an SPM obtained by multiplying the calculated SPM rate by the SPM of the press motion set when using all four capacitor units 60. When all the capacitor units 60 can be used, the limit of the PWM converter 33 is set to 80%, for example, and is set so that values above the limit will not be outputted. On the other hand, if any of the capacitor units 60 are set as unusable, the limit is 100%, that is, this is a state in which no limit is set, and the current value supplied from factory power supply 100 also increases.

1-5-4. Torque Limit Calculator

The torque limit calculator 74 calculates a value for limiting the torque of the servomotor 21. Limiting the torque allows the peak current to be reduced. Therefore, the torque limit calculator 74 calculates a torque limit value so as to attain a peak current at which it can be covered by the factory power supply 100 (the output from the PWM converter 33) and the number of usable capacitor units 60.

More specifically, if we let the maximum output of the servomotor 21 be Mw (W), let the lower limit voltage of the PWM converter 33 be Pmi (V), let the maximum current of one capacitor unit 60 be Cma (A), let the number of usable capacitor units 60 be Nb (0 to 3), and let the rated output from the PWM converter 33 be Pr (A), then the torque limit calculator 74 calculates the torque limit using the following calculation formulas (4) to (6).

$$\text{Motor maximum current} = Mw/Pmi \quad (4)$$

$$\text{Maximum allowable current} = Cma \times Nb + Pr \times 100 (\%) \quad (5)$$

$$\text{Torque limit (\%)} = \text{maximum allowable current} \div \text{motor maximum current} \times 100 \times \text{margin } 90\% \quad (6)$$

The motor maximum current value indicates the maximum current value supplied to the servomotor 21. It is the current value generated at the peak of pressing.

The maximum allowable current value indicates the maximum current value that can be supplied to the servo amplifier 22 when using the power supplied from the usable capacitor units 60 (for example, three) and the power supplied from the factory power supply 100 via the PWM converter 33.

The torque limit rate is set to a ratio of the maximum allowable current value to the motor maximum current value. In Formula (6), the torque limit is set to 90% of the above ratio in order to provide a power reserve of 10%.

Thus limiting the torque of the servomotor 21 makes it possible to suppress the current generated during the peak, and to cover the current generated at the peak of the torque during pressing at the maximum allowable current value.

The torque limit calculator 74 transmits the calculated torque limit to the servo amplifier 22. The servo amplifier 22 is set so as not to generate torque higher than the received torque limit.

1-5-5. Memory Unit

The memory unit 75 stores the number (Na) of capacitor units installed in the press device 1, the rated current (Cr (A)) of one capacitor unit 60, the rated output (Pr (A)) from the PWM converter 33, the limit (L (%)) set in the PWM converter, the maximum output (Mw (W)) of the servomotor 21, the lower limit voltage (Pmi (V)) of the PWM converter 33, the maximum current (Cma (A)) of one capacitor unit 60, and the margin (%). These values are extracted from the memory unit 75 by the SPM rate calculator 73 and the torque limit calculator 74.

1-5-6. Alarm Detector

The alarm detector 76 receives detection values from the four current sensors 61. Information about the capacitor units 60 that have been set as unusable is transmitted from the setting unit 82 to the alarm detector 76. The alarm detector 76 causes the display screen 81 to give an alarm display upon detecting that current is being supplied from a capacitor unit 60 set as unusable. The electrical connection of a capacitor unit 60 set as unusable to the DC bus line 14 must be physically disconnected by the operator, but if the supply of current is detected, this means that physical disconnection has not been performed, so an alarm is provided to the operator.

1-6. Operation Display Unit

Figure 4:
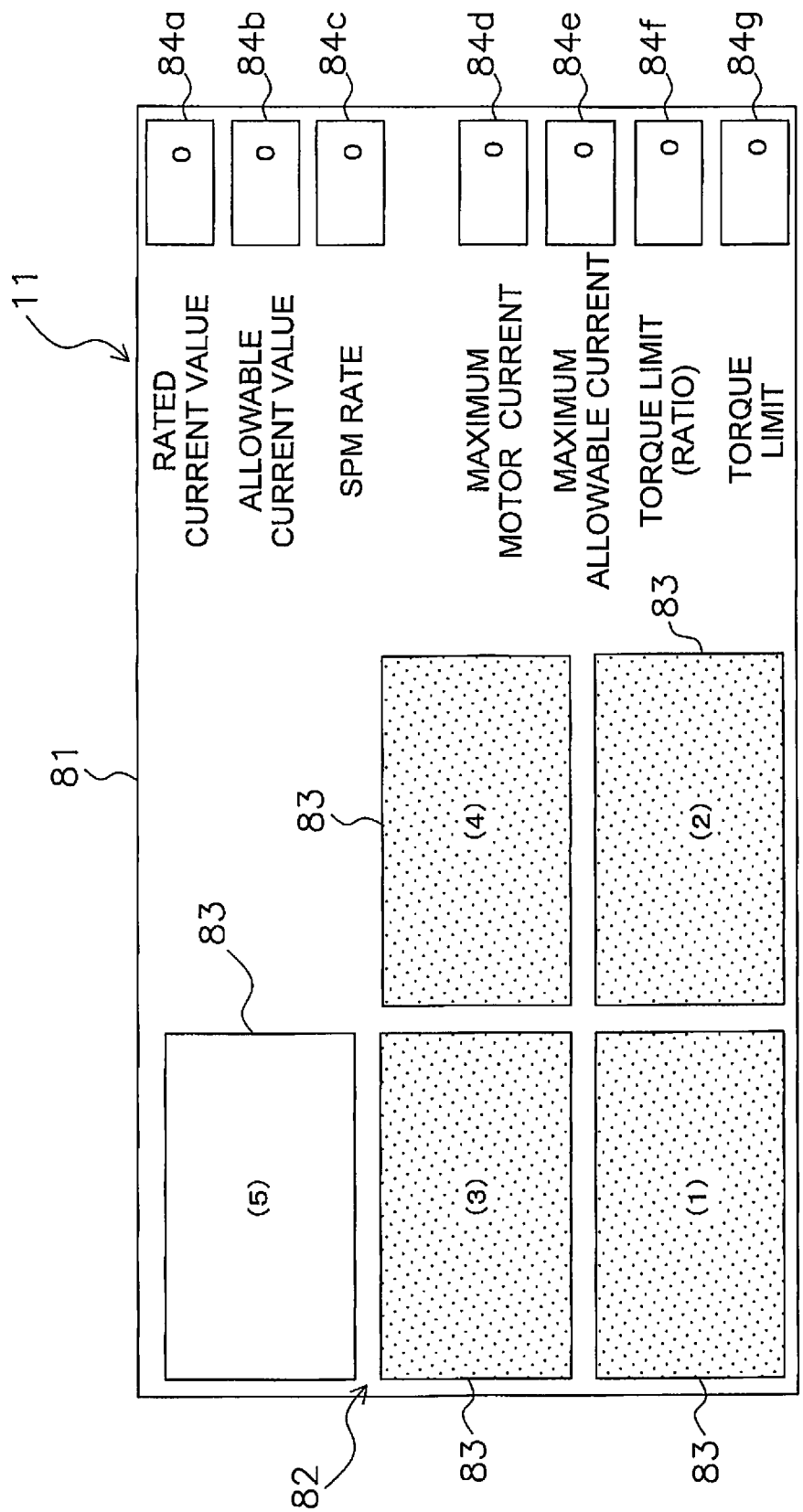
FIG. 4 is a diagram showing an example of an operation display unit of the press device in FIG. 1.

The operation display unit 11 comprises a display screen 81 and a setting unit 82. The operation display unit 11 is constituted by a touch panel or the like, and also functions as the display screen 81 and the setting unit 82. FIG. 4 shows an example of a display screen for setting a capacitor unit 60 as unusable.

The setting unit 82 is provided to the display screen 81 shown in FIG. 4. The setting unit 82 has five button portions 83.

With the screen shown in FIG. 4, the five button portions 83 that are numbered 1 to 5 are provided as an example, but in this embodiment, since there are four capacitor units 60 installed in the press device 1, only the four of the button portions 83 (numbers 1 to 4) are used, and the remaining button portion 83 (number 5) is not used. The four capacitor units 60 are distinguished corresponding to the button portions 83 (numbers 1 to 4). The number of capacitor units 60 installed in the press device 1 (namely, four) is stored in the memory unit 75.

A display portion 84a for displaying the rated current value, a display portion 84b for displaying the allowable current value, a display portion 84c for displaying the SPM rate, a display portion 84d for displaying the motor maximum current, a display portion 84e for displaying the maximum allowable current, a display portion 84f for displaying the torque limit (ratio), and a display portion 84g for displaying the torque limit are arranged in that order, starting from the top, on the right side of the setting unit 82 on the display screen 81.

For example, if an abnormality is detected in the capacitor unit 60 corresponding to number (2) by the state detector 71 and the display screen 81 displays something to that effect, the user moves to the screen shown in FIG. 4 and touches the button portion 83 (number 2). Consequently, as shown in FIG. 5, the button portion 83 (number 2) is changed from a usable state to an unusable state (see how the dots in FIG. 4 disappear in FIG. 5).

Thus, the setting unit 82 sets each of the button portions 83 (numbers 1 to 4) to usable or unusable. Setting usable or unusable for each button portion 83 selects any unused capacitor units 60 from among the four capacitor units 60. It could also be said that the capacitor units 60 to be used are selected from among the four capacitor units 60. That is, the setting unit 82 performs setting for the plurality of capacitor units 60 such that a portion of the capacitor units 60 is not used.

The setting unit 82 transmits to the SPM rate calculator 73 and the torque limit calculator 74 information indicating that there are three capacitor units 60 that can be used.

Figure 5:
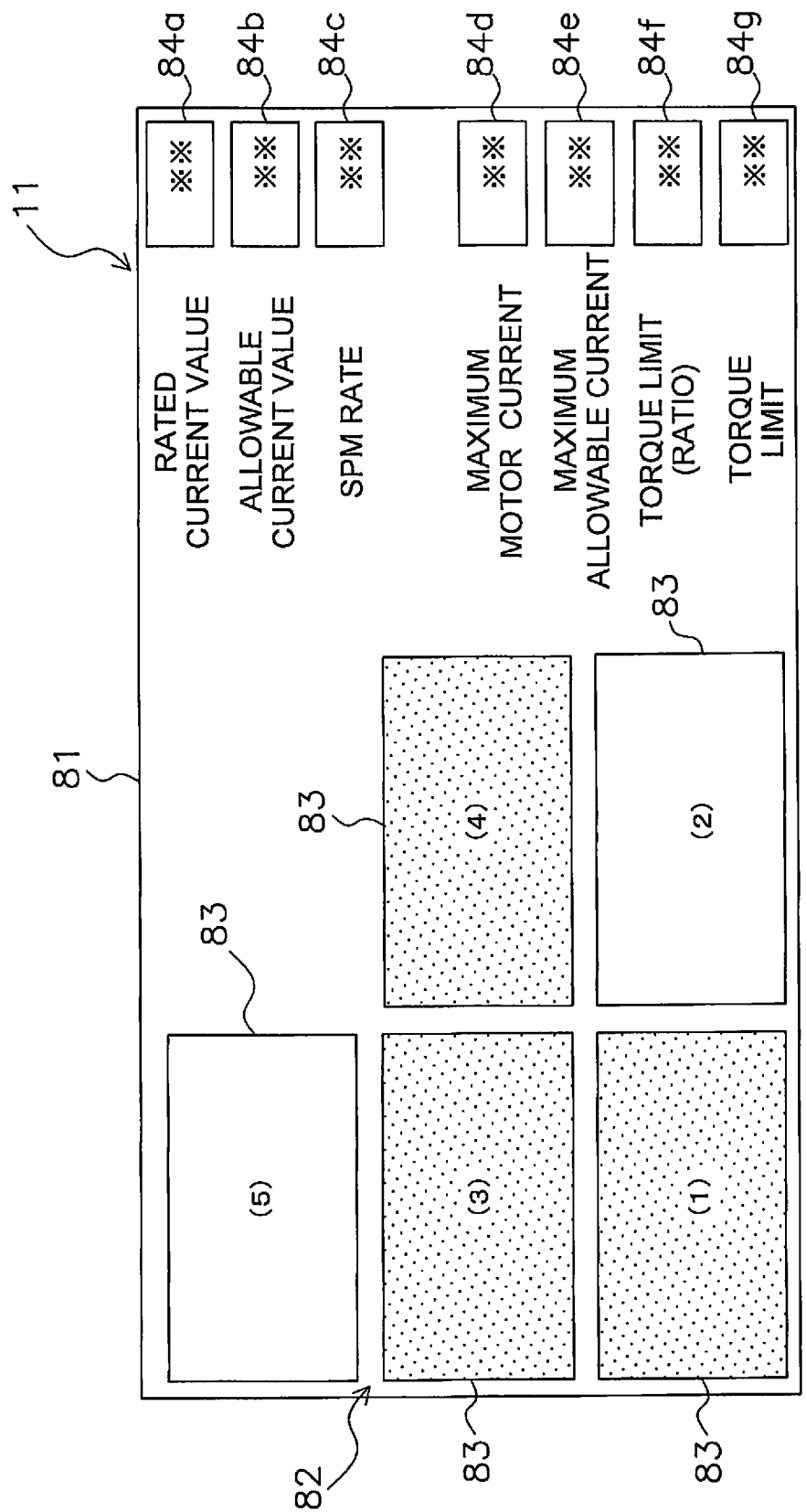
FIG. 5 is a diagram showing a state in which the number 2 capacitor unit 60 is set to be invalid (unusable) in the operation display unit of the press device in FIG. 1.

Then, as described above, the rated current value, the allowable current value, and the SPM ratio are calculated by the SPM rate calculator 73, the motor maximum current, the maximum allowable current, the torque limit (ratio), and the torque limit are calculated by the torque limit calculator 74, and the calculated values are displayed on the display portions 84a to 84g in FIG. 5.

2. Operation

The operation of the press device 1 in an embodiment of the present invention will now be described, and an example of the method for controlling the press device of the present invention will also be given.

First, the press operation in the normal operation mode by the press device 1 will be described, after which the operation related to the emergency operation mode when a portion of the capacitor units 60 has become unusable will be described.

2-1. Press Operation in Normal Operation Mode

Figure 6:
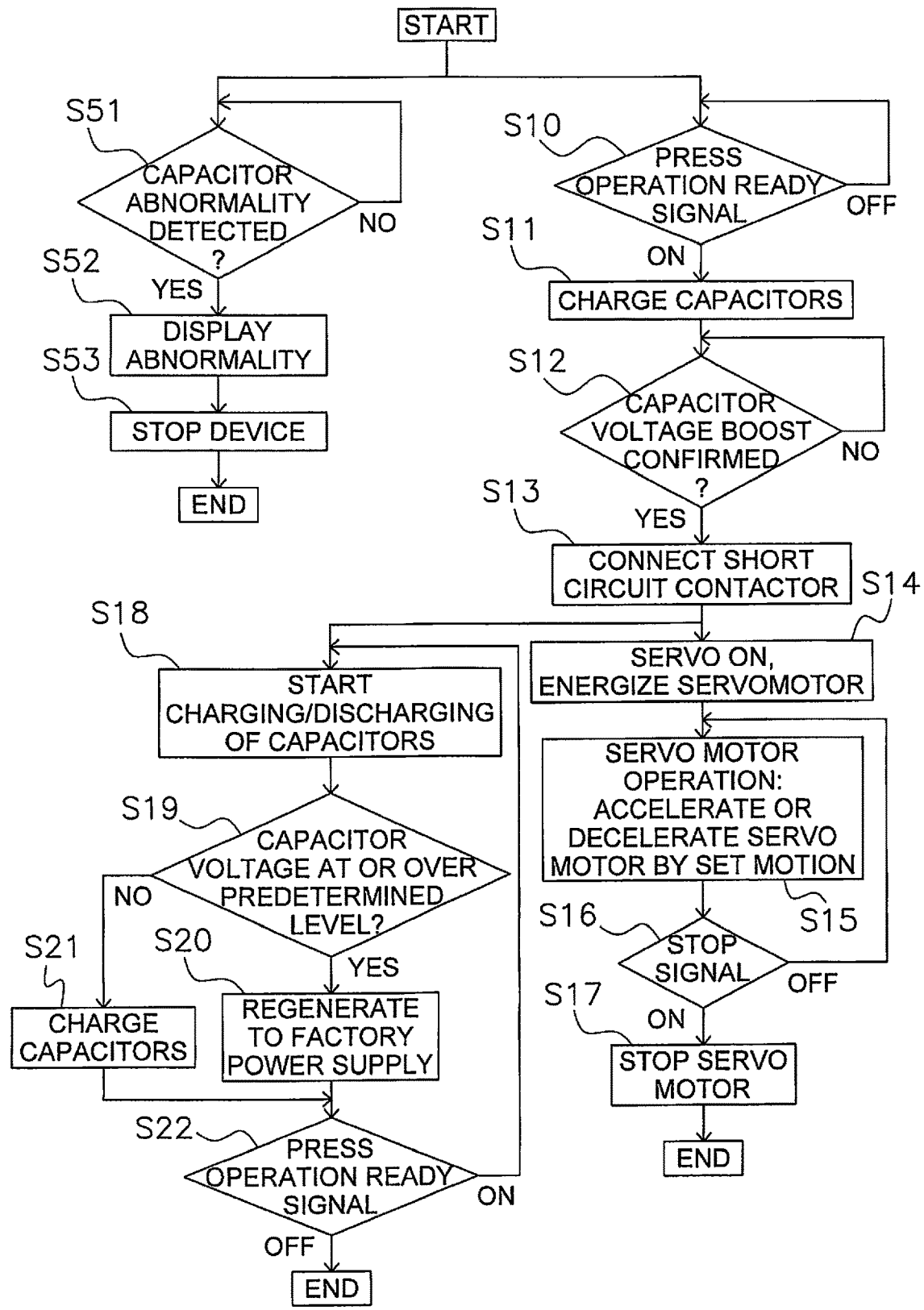
FIG. 6 is a flowchart of the control operation in a normal operation mode of the press device in FIG. 1.

FIG. 6 is a flowchart of the control operation in normal operation mode of the press device.

First, in step S10 it is detected whether or not a press operation ready signal is being outputted from the controller 10. The press operation ready signal is a signal that is outputted when the user presses a button when operating the press device 1, and is a signal indicating that the press device 1 is ready to operate normally.

Next, in step S11 the electric double layer capacitors 601 are charged. Since the short circuit contactor 43 is in its off state, no current flows to the bypass line 15, and the power outputted from the PWM converter 33 flows to the initial charging circuit 41. An electric charge is accumulated in the electric double layer capacitors 601 connected to the DC bus line 14 while current control is performed by the DC/DC converter 51 of the initial charging circuit 41. The DC/DC converter 51 monitors the voltage of the DC bus line 14. In step S12, charging is performed until the voltage of the electric double layer capacitors 601 is boosted to a predetermined level. The DC/DC converter 51 concludes that charging is complete when the input voltage and the output voltage match, and halts the operation.

When it is detected in step S12 that the voltage of the electric double layer capacitors 601 has been boosted to the predetermined level by the DC/DC converter 51, in step S13 the controller 10 connects the short circuit contactor 43. Consequently, the output from the PWM converter 33 bypasses the initial charging circuit 41 and is supplied to the servo amplifier 22, and charging and discharging from the electric double layer capacitors 601 is commenced in step S18.

When the short circuit contactor 43 is connected in step S13, the controller 10 energizes the servomotor 21 in step S14.

Next, in step S15 the servomotor 21 is operated in accordance with the set motion to move the slide 2 up and down. As the slide 2 moves downward, the servomotor 21 accelerates up to a predetermined speed, after which it is driven at a constant speed. Along with the rotation of the crankshaft 25 produced by the drive of the servomotor 21, the slide 2 rises after reaching bottom dead center. Then, the servomotor 21 is decelerated from a specific position in order to stop the slide 2 at top dead center.

When a stop signal for the servomotor 21 is outputted in step S16, the servomotor 21 is stopped in step S17. As a result, the slide 2 stops at top dead center.

Figure 7:
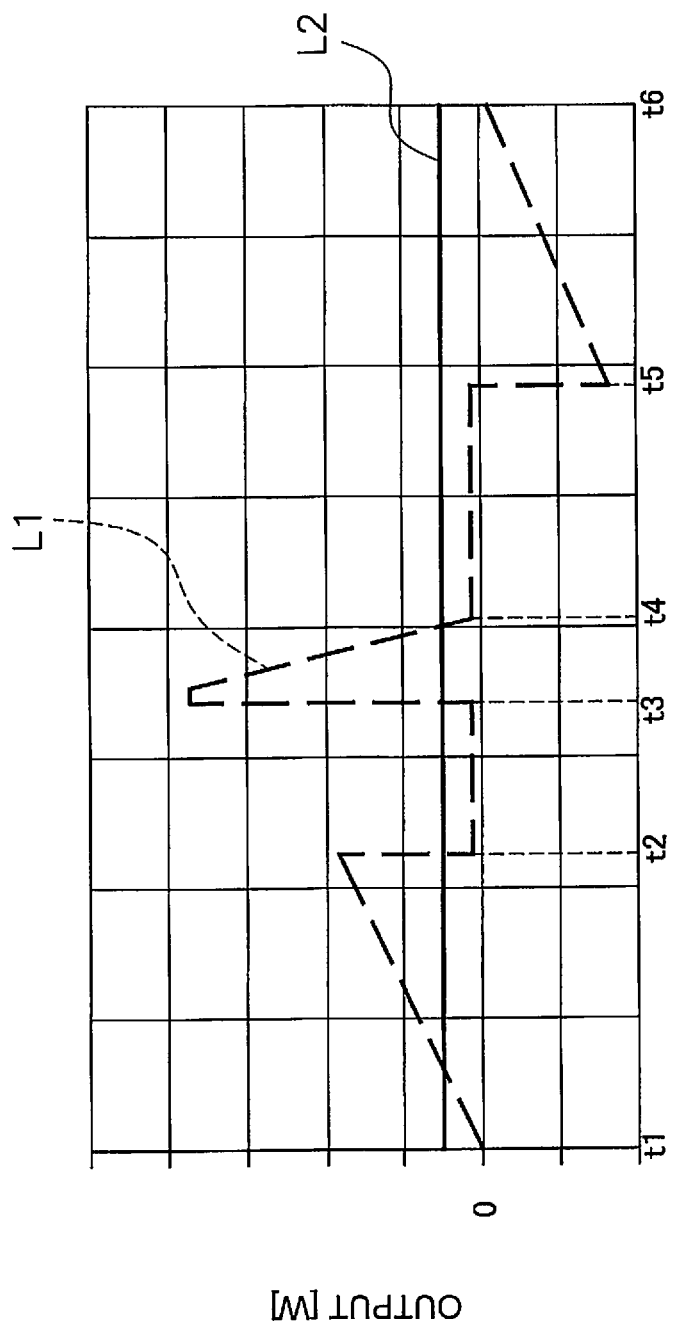
FIG. 7 is a diagram showing power supplied from a factory power supply when using the press device in FIG. 1.

The change in power consumption during pressing will be described with reference to FIG. 7. FIG. 7 is a graph of the change in power during pressing. A dotted line L1 and a solid line L2 are shown in FIG. 7. The dotted line L1 shows the change over time in the power consumption of the press device 1 during pressing. The solid line L2 shows the change over time in the power supplied from the factory power supply 100.

The downward movement of the slide 2 begins at the time t1 in FIG. 7, and from the time t1 to t2, the servomotor 21 is accelerated until it reaches a predetermined speed, and the servomotor 21 consumes power. When power is consumed by the servomotor 21 and the voltage of the DC bus line 14 decreases, a preset constant power is supplied from the servo power supply unit 5. As shown by the solid line L2, since only constant power is supplied from the servo power supply unit 5, any shortfall is supplied from the electric double layer capacitors 601. That is, any amount exceeding the solid line L2 in the dotted line L1 is supplied from the electric double layer capacitors 601.

When the speed of the servomotor 21 reaches a predetermined speed at the time t2, the servomotor 21 is driven at a constant speed from the time t2. Since the load on the servomotor 21 is low from the time t2 to the time t3 at which the upper die 7 comes into contact with the material (workpiece), the power consumption indicated by the dotted line L1 is also low. At this point, the electric double layer capacitors 601 are charged with the electric power exceeding the dotted line L1 in the solid line L2.

Next, the slide 2 is further lowered from the time t3, and pressing is performed on the workpiece until the time t4. The power consumption peaks at this point, but as described above, a preset constant power is supplied from the servo power supply unit 5, and any shortfall in power is supplied from the electric double layer capacitors 601.

When the slide 2 reaches a predetermined position, the controller 10 decelerates the servomotor 21 to stop the slide 2 at top dead center. The time t5 in FIG. 7 indicates the deceleration start time of the servomotor 21, and the time t6 indicates the end of this deceleration. As shown in FIG. 7, from the time t5 to t6, the output is on the negative side, and regenerative power is being generated in the servomotor 21. This regenerative power is used to charge the electric double layer capacitors 601.

On the other hand, during the press working of steps S14 to S17, the control of steps S18 to S22 is performed in parallel. As described above, the connection of the short circuit contactor 43 in step S13 commences the charging and discharging of the electric double layer capacitors 601 in step S18.

Then, in the next step S19, the PWM converter 33 determines whether or not the voltage of the DC bus line 14 is at or over a predetermined level. If the voltage of the DC bus line 14 is at or over the predetermined level, control proceeds to step S20, and the power is regenerated to the factory power supply 100 by the power regeneration function of the PWM converter 33. Since the voltage of the DC bus line 14 is equal to the voltage of the electric double layer capacitors 601, the PWM converter 33 is detecting the voltage of the electric double layer capacitors 601. That is, if the charge amount of the electric double layer capacitors 601 is at or over a predetermined level, the regenerative power generated by the servomotor 21 is sent to the factory power supply 100. Also, if the voltage of the DC bus line 14 is lower than the predetermined voltage in step S19, the electric double layer capacitors 601 are charged in step S21.

In the next step S22 it is determined whether or not a press operation ready signal is being outputted from the controller 10. As long as a press operation ready signal is being detected, steps S18 to S21 are repeated. Also, when it is detected in step S22 that the press operation ready signal is not being outputted from the controller 10, the control comes to an end.

After the electric double layer capacitors 601 have been charged the first time, they are charged by regenerative power produced during deceleration of the servomotor 21 or the like. For this reason, input from the factory power supply 100 need not be performed.

As described above, because the chargeable electric double layer capacitors 601 are provided, any shortfall in power will be supplied from the electric double layer capacitors 601, so the power supplied from the factory power supply 100 can be held constant as shown in FIG. 7.

The control in steps S51 to S53 is performed in parallel with the control in steps S10 to S22. In step S51, the state detector 71 performs abnormality detection for the capacitor units 60 on the basis of the detection values of the current sensor 61 and the temperature sensor 62.

When an abnormality is detected in step S51, in step S52 the state detector 71 causes the display screen 81 to give a display to the effect that an abnormality in a capacitor unit 60 has been detected. At this point, information (the numbers (1) to (4) as shown in FIG. 4) indicating in which capacitor unit 60 the abnormality has been detected is also displayed. Next, the state detector 71 temporarily halts the press device 1.

Thus, when an abnormality such as failure or deterioration is detected in any of the capacitor units 60 (numbers 1 to 4) connected in parallel to DC bus line 14, pressing can be performed in emergency operation mode (discussed below).

2-2. Calculation of SPM Rate and Torque Limit in Emergency Operation Mode

Figure 8:
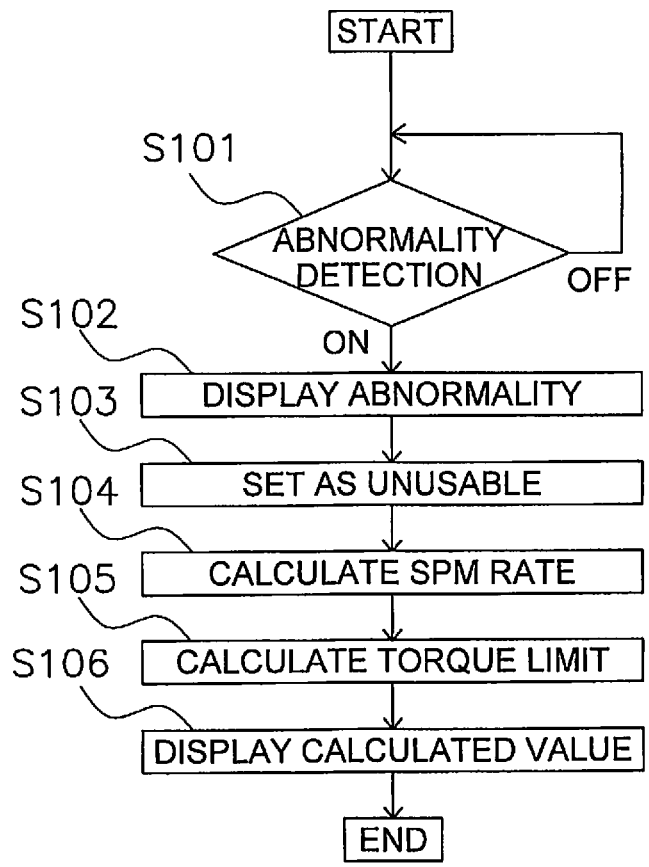
FIG. 8 is a diagram showing the operation flow when an abnormality is detected in a capacitor unit in the press device of FIG. 1.

As described above, when an abnormality was detected in that capacitor unit 60, the controller 10 calculates the SPM rate and the torque limit in emergency operation mode in order to execute emergency operation mode when the operator has set that a capacitor unit 60 as unusable. FIG. 8 is a flowchart of the operation when calculating the SPM rate and the torque limit.

In step S101, when the state detector 71 detects an abnormality in any one of the four capacitor units 60 on the basis of the detection values of the current sensor 61 and the temperature sensor 62, in step S102 the state detector 71 causes the display screen 81 to display that an abnormality has been detected. The display screen 81 displays, for example, that an abnormality has occurred in the number (2) capacitor unit 60.

Next, in step S103, when the button portion 83 of the number (2) capacitor unit 60 is pressed, the display of the button portion 83 changes, and the number (2) capacitor unit 60 is set as unusable (invalid). The setting unit 82 transmits the number of usable capacitor units 60 to the SPM rate calculator 73 and the torque limit calculator 74. Here, the physical connection (power line or the like) to the DC bus line 14 of the number (2) capacitor unit 60 is disconnected by the worker.

Next, in step S104 the SPM rate calculator 73 calculates the effective current that can be supplied by the usable capacitor units 60 and the factory power supply 100 (more precisely, the output from the PWM converter 33), and the ratio of the calculated effective current to the effective current in a capacitor full state (a state in which all of the installed capacitor units 60 can be used) is set as the SPM ratio (%). More specifically, the SPM rate calculator 73 calculates the SPM rate by plugging the number (Nb) of usable capacitor units 60 received from the setting unit 82, the number (Na) of capacitor units stored in the memory unit 75, the rated current (Cr (A)) of one capacitor unit 60, the rated output (Pr (A)) from PWM converter 33, and the limit (L (%)) set for the PWM converter into the above Formulas (1) to (3).

Next, in step S105 the torque limit calculator 74 calculates the peak current that can be supplied by the usable capacitor units 60 and the factory power supply 100 (more precisely, the output from the PWM converter 33), and sets the ratio of the calculated peak current to the peak current in a capacitor full state (a state in which all of the installed capacitor units 60 can be used) as the torque limit rate (%).

More specifically, the torque limit calculator 74 calculates the torque limit by plugging the number (Nb) of usable capacitor units 60 received from setting unit 82, the number (Na) of capacitor units stored in memory unit 75, the rated output (Pr (A)) from the PWM converter 33, the maximum output of the servomotor 21 (Mw (W)), the lower limit voltage of the PWM converter 33 (Pmi (V)), the maximum current of one capacitor unit 60 (Cm (A)), and the margin (%) into the above formulas (4) to (6).

Next, in step S106 the values extracted from the memory unit 75 and the calculated values are displayed in the display portions 84a to 84g.

The SPM rate and the torque limit are calculated as described above. If all the capacitor units 60 become unusable, the SPM rate and the torque limit are calculated at Nb=0. That is, the SPM rate and the torque limit are set so as to attain a peak current and an effective current value at which operation is possible with just the power supplied from the factory power supply 100 via the PWM converter 33.

2-3. Press Operation in Emergency Operation Mode

When at least one capacitor unit 60 is set as unusable in step S103, the controller 10 executes emergency operation mode when a press operation is performed.

Figure 9A:
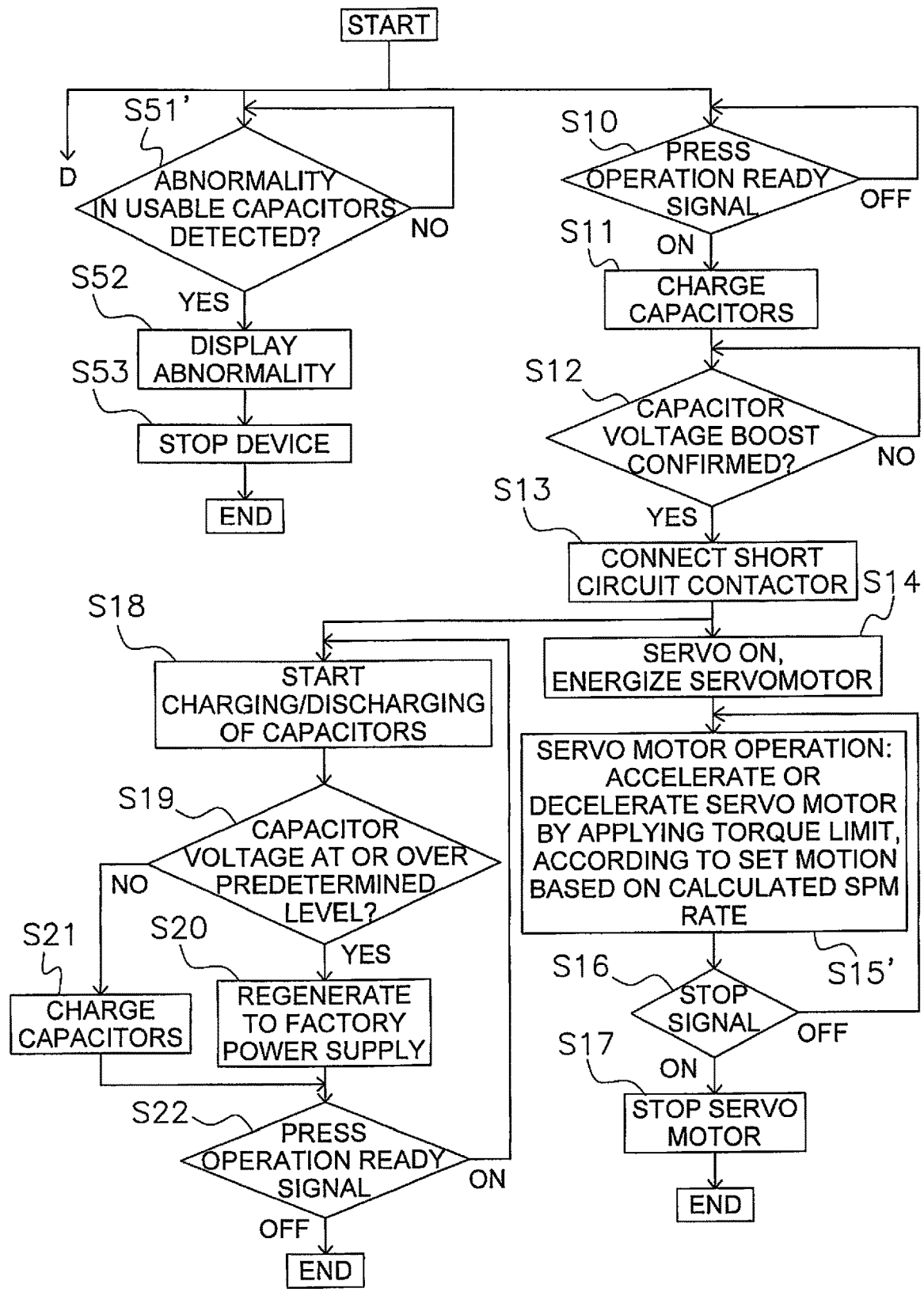
FIG. 9A is a flowchart of the control operation in the emergency operation mode of the press device in FIG. 1.
Figure 9B:
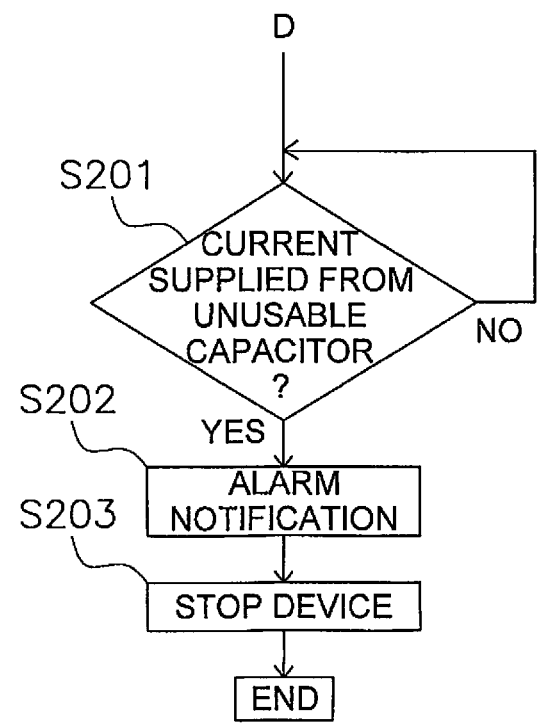
FIG. 9B is a flowchart of the control operation in the emergency operation mode of the press device in FIG. 1.

FIGS. 9A and 9B are flowcharts of the operation of the press device 1 in emergency operation mode. The normal mode shown in FIG. 6 and the emergency operation mode shown in FIGS. 9A and 9B depending on a setting of unusable at the setting unit 82, for example. When at least one of the capacitor units 60 installed in the press device 1 is set as unusable, the press operation is conducted in emergency operation mode. When all the capacitor units 60 installed in the press device 1 are usable, the press operation is conducted in normal operation mode.

The emergency operation mode shown in FIGS. 9A and 9B has a step S15' instead of the step S15 of the normal operation mode shown in FIG. 6, and has a step S51' instead of step S51. In addition, the emergency operation mode has steps S201, S202 and S203, unlike the normal operation mode. The other steps in the emergency operation mode are the same as the steps in the normal operation mode, so they will not be described. When pressing is conducted in step S15' in emergency operation mode, the controller 10 executes pressing in emergency operation mode using the calculated SPM rate and torque limit.

More precisely, the SPM rate calculator 73 transmits the calculated SPM rate to the press motion control unit 72. The press motion control unit 72 transmits a position command to the servo amplifier 22 so as to perform press motion at the SPM obtained by multiplying the transmitted SPM rate by the SPM when all the capacitor units 60 are used.

Also, the torque limit calculator 74 sets the servo amplifier 22 so as to limit the torque with the calculated torque limit.

Thus, pressing is conducted on the basis of the calculated SPM rate and torque limit.

Here, in emergency operation mode, since the SPM is lowered, the effective current can be ensured with the power supplied from the usable capacitor units 60 (excluding the capacitor unit 60 set as unusable) and the constant power supplied from the factory power supply 100. Also, in emergency operation mode, since the torque limit is set, the peak current can be ensured with the power supplied from the usable capacitor units 60 (excluding the capacitor units 60 set as unusable) and the constant power supplied from the factory power supply 100.

Further, in step S51', in emergency operation mode the state detector 71 tries to detect an abnormality in the capacitor units 60 set to be usable. Here, any of the capacitor units 60 that have been set as unusable are set to be invalid if an abnormality is detected by the state detector 71.

Furthermore, in emergency operation mode, steps S201 to S203 are performed in parallel with steps S10 to S14, S15', S16 to S22, and steps S51', S52, and S53. In step S201, when the alarm detector 76 detects that current is being supplied from a capacitor unit 60 set as unusable to the DC bus line 14 on the basis of the detection value produced by the current sensor 61, it is concluded that the power line of the capacitor unit 60 set as unusable has not been disconnected from the DC bus line 14, and the control proceeds to step S202. In step S202, the alarm detector 76 causes the display screen 81 to display an alarm and notifies the operator of the alarm detection.

Next, the alarm detector 76 stops the control. Consequently, it can be detected that the capacitor unit 60 in which the abnormality has occurred has not been physically removed from the DC bus line, and the operator can be notified to that effect.

3. Features, Etc.

(3-1)

The press device 1 in this embodiment is a press device that subjects a material to pressing using the upper die 7 and the lower die 8, and comprises the slide 2, the bolster 3, the servomotor 21, a plurality of the capacitor units 60, and the controller 10 (an example of a control unit). The upper die 7 is attached to the lower face of the slide 2. The bolster 3 is disposed below the slide 2 and the lower die 8 is placed thereon. The servomotor 21 drives the slide 2. The plurality of capacitor units 60 have a plurality of electric double layer capacitors 601 and can supply stored power to the servomotor 21. When a plurality of the capacitor units 60 have been set such that at least a portion of the capacitor units 60 will not be used, the controller 10 executes an emergency operation mode (an example of an operation mode) in which pressing is performed using the capacitor units 60 other than the unused capacitor units 60.

As a result, even if a portion of the capacitor units 60 have become unusable, pressing can be executed in emergency operation mode using the capacitor units 60 other than the unusable ones. When the press device 1 is used on an automobile production line, the user does not wish to completely shut down the production line, and in many cases it is preferable to keep operating even at a reduced production capacity. This can be achieved with the press device 1 of this embodiment.

(3-2)

With the press device 1 in this embodiment, by setting (an example of being selected) at least some of the capacitor units 60 as unusable (an example of a portion of the capacitor units that are not used), a setting is made so that at least a portion of them will not be used. In emergency operation mode, pressing is performed using the capacitor units 60 other than the capacitor units 60 set as unusable (an example of the selected capacitor units).

Consequently, when some of the capacitor units 60 have become unusable, those capacitor unit 60 are set as unusable, which allows pressing to be performed in emergency operation mode using the capacitor units 60 other than the unusable ones.

(3-3)

With the press device 1 in this embodiment, at least some of the capacitor units 60 are set not to be used by setting (an example of selecting) those capacitor units 60 other than a portion of the capacitor units 60 as usable. In emergency operation mode, pressing is performed using the capacitor units 60 set as usable (an example of the selected capacitor units).

As a result, when some of the capacitor units 60 become unusable, the capacitor units 60 other than those capacitor units 60 are set as usable, which allows pressing to be performed in emergency operating mode using the capacitor units 60 other than the unusable ones.

(3-4)

With the press device 1 in this embodiment, in emergency operation mode (an example of an operation mode), pressing is performed by receiving the supply of power from the capacitor units 60 other than those capacitor units 60 that have been set as unusable (an example of capacitor units that are not used) and from the factory power supply 100.

As a result, even if some of the capacitor units 60 become unusable, pressing can be executed in emergency operation mode by receiving the supply of power from the capacitor units 60 other than the unusable ones and the factory power supply 100.

(3-5)

With the press device 1 in this embodiment, in emergency operation mode, the capability of pressing is limited on the basis of the number of capacitor units 60 other than the capacitor units 60 set as unusable (an example of capacitor units that are not used).

The smaller is the number of capacitor units 60 that can be used, the smaller is the amount of current that can be supplied, so an operation mode can be executed by increasing the limit imposed on the pressing capability.

(3-6)

With the press device 1 in this embodiment, the controller 10 (an example of a control unit) executes an emergency operation mode by using the factory power supply 100 (an example of an external power supply), without using the capacitor units 60 when there are no capacitor units 60 other than capacitor units 60 that have been set as unusable (an example of capacitor units that are not used).

For example, even when all the capacitor units 60 become unusable, pressing can still be performed in emergency operation mode.

(3-7)

With the press device 1 in this embodiment, the pressing capability includes at least one of the SPM and the torque of the servomotor 21.

The SPM (shots per minute) affects the effective current of the capacitor units 60, and the torque of the servomotor 21 affects the peak current in pressing.

Therefore, since the effective value of the current can be reduced by limiting the SPM, the current supplied from the reduced number of capacitor units 60 and the current outputted from the PWM converter 33 can cover the current required for operation. Also, since the peak current can be reduced by limiting the motor torque, the current supplied from the reduced number of capacitor units 60 and the current outputted from the PWM converter 33 can cover the current required for operation.

(3-8)

The press device 1 of this embodiment further comprises the setting unit 82 (an example of a selector) that performs setting as unusable (an example of selection) for each of the plurality of capacitor units.

As a result, the user can operate the setting unit 82 to set a specific capacitor unit 60 as unusable.

(3-9)

With the press device 1 in this embodiment, the pressing capability includes the SPM. The controller 10 has the SPM rate calculator 73 (an example of a calculator) and the press motion control unit 72. The SPM rate calculator 73 calculates the ratio of the allowable current value that can be supplied to the servomotor 21 when using the factory power supply 100 (an example of an external power supply) and the usable capacitor units 60 (an example of capacitor units other than unused capacitor units), to the rated current value that can be supplied to the servomotor 21 when using the factory power supply 100 and all of the capacitor units 60. The press motion control unit 72 controls the motion of the servomotor 21 so as to perform pressing at an SPM that is limited on the basis of this ratio.

This makes it possible to find an SPM based on an effective current value that can be covered by the reduced number of capacitor units 60.

Therefore, even though the capability is in a limited state, it is still possible to perform pressing using a reduced number of capacitor units 60.

(3-10)

With the press device 1 in this embodiment, the pressing capability includes the torque of the servomotor 21. The controller 10 (an example of a control unit) calculates the ratio of the maximum allowable current that can be supplied to the servomotor 21 when using the factory power supply 100 (an example of an external power supply) and the usable capacitor units 60 (an example of capacitor units other than unused capacitor units), to the maximum current supplied to the servomotor 21 when using the factory power supply 100

(an example of an external power supply) and all the capacitor units 60, and limits the torque of the servomotor 21 on the basis of this ratio.

This makes it possible to find the torque limit based on the peak current that can be covered by the reduced number of capacitor units 60.

Therefore, even though the capability is in a limited state, it is still possible to perform pressing using a reduced number of capacitor units 60.

(3-11)

The press device 1 of this embodiment further comprises the current sensor 61 (an example of a current measurement unit) and the alarm detector 76 (an example of a detector). The current sensor 61 measures the current supplied from each of the plurality of capacitor units 60. The alarm detector 76 causes the display screen 81 (an example of a display unit) to display an alarm when it is detected, on the basis of the measurement result of the current sensor 61, that current is being supplied from a capacitor unit 60 set as unusable (an example of a capacitor unit that is not used) at the setting unit 82 (an example of a selector).

When a specific capacitor unit 60 is set to be unusable by the setting unit 82, it is necessary to physically remove the electrical connection to the servomotor 21 of the capacitor unit 60 to be set as unusable, but it is conceivable that the user may forget to remove the connection. Here, when current is detected from a capacitor unit 60 that has been set to be unusable, it is concluded that the user has forgotten to make the disconnection, and an alarm is issued to notify the user.

(3-12)

The method for controlling the press device 1 in this embodiment is a method for controlling the press device 1 comprising the slide 2 to which the upper die 7 is attached, and the bolster 3 on which the lower die 8 is placed, said method comprising a step S15' (an example of an execution step). In step S15' (an example of an execution step), an emergency operation mode (an example of an operation mode) is executed in which pressing is performed using capacitor units 60 other than unused capacitor units 60, when a setting has been made such that at least some of the plurality of capacitor units 60 that have the plurality of electric double layer capacitors 601 and are capable of supplying stored power to the servomotor 21 that drives the slide 2 are not used.

As a result, even though some of the capacitor units 60 become unusable, pressing can still be performed in emergency operation mode using the capacitor units 60 other than the unusable ones. When the press device 1 is used on an automobile production line, the user does not wish to completely shut down the production line, and in many cases it is preferable to keep operating even at a reduced production capacity. This can be achieved with the press device control method of this embodiment.

4. Other Embodiments

An embodiment of the present invention was described above, but the present invention is not limited to or by this embodiment, and various modifications are possible without departing from the gist of the invention.

(A)

In the above embodiment, SPM and torque are limited as the limitation of the capability of the press, but just one or the other may be used, and the present invention is not limited to these, with other limitations also being possible.

(B)

In the above embodiment, an abnormality of a capacitor unit 60 is detected by the current sensor 61 and the temperature sensor 62 in steps S51 to S53, but the current sensor 61, the temperature sensor 62, etc., need not be provided, and the invention is not limited to automatic detection by a sensor. For instance, a capacitor unit 60 may be set to be unusable if a worker has detected an abnormality during regular maintenance and inspection.

(C)

In the above embodiment, no limit (L) is provided to the output from the PWM converter 33 at the allowable current value in the calculation of the SPM rate, but a limit may be provided. Also, although a margin is set in the calculation of the torque limit, a margin need not be set.

(D)

In the above embodiment, four capacitor units 60 in which 24 electric double layer capacitors 601 are connected in series are provided, and the four capacitor units 60 are connected in parallel, but the number and connection configuration are not limited to these.

(E)

In the above embodiment, the operation display unit 11 is a touch panel, and the setting unit 82 is provided on the display screen 81, but the setting unit 82 may be provided separately from the display screen 81, in the form of a keyboard or a mouse, for example.

(F)

Although the rated current and the maximum current of the four capacitor units 60 are the same in the above embodiment, they may also be different. As long as the number of a capacitor unit 60 corresponds to the rated current and the maximum current thereof, it will be possible to find the maximum current (corresponding to $Cmax \times Nb$ of Formula (5)) in the sum of the usable capacitor units 60, and the rated current (corresponding to $Cr \times Nb$ of Formula (2)) in the sum of the usable capacitor units 60, so the SPM rate and the torque limit can be calculated.

(G)

Although a capacitor unit 60 in which an abnormality has been detected is set to be unusable in the above embodiment, this is not limited to a situation in which an abnormality is detected. Even a capacitor unit 60 in which no abnormality has been detected (that is, a usable capacitor unit 60) may be set so as not to be used. In other words, a capacitor unit 60 that will not be used in pressing (set as unused), or a capacitor unit 60 that will be used may be selected. That is, in the above embodiment, "unusable" or "usable" is set for each capacitor unit 60, but this is not the only option, and "used" or "not used" may be set.

The press device and the press device control method of the present invention have the effect of allowing pressing to be performed even when some of the plurality of power storage devices become unusable, and is useful, for example, in a factory production line, etc.

The invention claimed is:

1. A press device for subjecting a material to pressing using an upper die and a lower die, the press device comprising:
    a slide configured to have the upper die attached to a lower face thereof;
    a bolster disposed below the slide, the bolster being configured to have the lower die placed thereon;
    a servomotor configured to drive the slide;
    a plurality of capacitor units including a plurality of electric double layer capacitors, the plurality of capacitor units being configured to supply stored electric power to the servomotor; and a control unit configured to execute an operation mode in which pressing is performed using electric power from an external power supply and capacitor units other than unused capacitor units when the plurality of capacitor units have been set so that at least a portion of the capacitor units are not used, in the operation mode, a pressing capability of the press device being limited based on a number of the capacitor units other than the unused capacitor units, the pressing capability including SPM, and the control unit including
a calculator configured to calculate a ratio of
an allowable current value that can be supplied to the servomotor when using the external power supply and the capacitor units other than the unused capacitor units,
to a rated current value that can be supplied to the servomotor when using the external power supply and all of the capacitor units, and
a press motion control unit configured to control a motion of the servomotor so that pressing is performed at an SPM that has been limited based on the ratio.

2. The press device according to claim 1, wherein
the setting of the plurality of capacitor units is performed by selecting the portion of the capacitor units, and
in the operation mode, pressing is performed using capacitor units other than the selected capacitor units.

3. The press device according to claim 2, further comprising:
a selector configured to perform the selection on each of the plurality of capacitor units.

4. The press device according to claim 1, wherein
the setting of the plurality of capacitor units is performed by selecting capacitor units other than the portion of the capacitor units, and
in the operation mode, pressing is performed using the selected capacitor units.

5. The press device according to claim 1, wherein
the control unit is further configured to execute the operation triode using the external power supply, without using any capacitor units, when there are no capacitor units other than the unused capacitor units.

6. The press device according to claim 1, further comprising:
a current measurement unit configured to measure current supplied from each of the plurality of capacitor units; and
a detector configured to display an alarm on a display unit upon detecting that current is being supplied from the unused capacitor units, based on a measurement by the current measurement unit.

7. A press device for subjecting a material to pressing using an upper die and a lower die, the press device comprising:
a slide configured to have the upper die attached to a lower face thereof;
a bolster disposed below the slide, the bolster being configured to have the lower die placed thereon;
a servomotor configured to drive the slide;
a plurality of capacitor units including a plurality of electric double layer capacitors, the plurality of capacitor units being configured to supply stored electric power to the servomotor; and
a control unit configured to execute an operation mode in which pressing is performed using electric power from an external power supply and, capacitor units other than unused capacitor units when the plurality of capacitor units have been set so that at least a portion of the capacitor units are not used, in the operation mode, a pressing capability of the press device being limited based on a number of the capacitor units other than the unused capacitor units, the pressing capability including torque of the servomotor, and the control unit being further configured to
calculate a ratio of
a maximum allowable current that can be supplied to the servomotor when using the external power supply and the capacitor units other than the unused capacitor units,
to a maximum current that can be supplied to the servomotor when using the external power supply and all of the capacitor units, and
limit the torque of the servomotor based on the ratio.

8. The press device according to claim 7, wherein
the setting of the plurality of capacitor units is performed by selecting the portion of the capacitor units, and
in the operation mode, pressing is performed using capacitor units other than the selected capacitor units.

9. The press device according to claim 8, further comprising:
a selector configured to perform the selection on each of the plurality of capacitor units.

10. Me press device according to claim 7, wherein
the setting of the plurality of capacitor units is performed by selecting capacitor units other than the portion of the capacitor units, and
in the operation mode, pressing is performed using the selected capacitor units.

11. The press device according to claim 7, wherein
the control unit is further configured to execute the operation mode using the external power supply, without using any capacitor units, when there are no capacitor units other than the unused capacitor units.

12. The press device according to claim 7, further comprising:
a current measurement unit configured to measure current supplied from each of the plurality of capacitor units; and
a detector configured to display an alarm on a display unit upon detecting that current is being supplied from the unused capacitor units, based on a measurement by the current measurement unit.

13. A method for controlling a press device including a slide with an upper die attached to a lower face thereof, a bolster with a lower die placed thereon, and a servomotor that drives the slide, the method for controlling the press device comprising:
executing an operation mode in which pressing is performed using electric power from an external power supply and capacitor units other than unused capacitor units when a plurality of capacitor units have been set so that at least a portion of the capacitor units are not used, the capacitor units having a plurality of electric double layer capacitors and being able to supply stored power to the servomotor;
limiting a pressing capability of the press device in the operating mode based on a number of the capacitor units other than the unused capacitor units, the pressing capability including SPM;

calculating a ratio of
- an allowable current value that can be supplied to the servomotor when using the external power supply aid the capacitor units other than the unused capacitor units,
- a rated current value that can be supplied to the servomotor when using the external power supply and all of the capacitor unit; and controlling a motion of the servomotor so that pressing is performed at an SPM that has been limited based on the ratio.

* * * * *